United States Patent
Hilmo et al.

(10) Patent No.: US 10,425,349 B2
(45) Date of Patent: *Sep. 24, 2019

(54) IDLE WORKER-PROCESS PAGE-OUT

(71) Applicant: Microsoft Technology Licensing, LLC, Redmond, WA (US)

(72) Inventors: Wade Hilmo, Snohomish, WA (US); Eok Kim, Bothell, WA (US); Yamini Jagadeesan, Redmond, WA (US); Ahmed ElSayed, Bellevue, WA (US); Erez Benari, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/407,039

(22) Filed: Jan. 16, 2017

(65) Prior Publication Data
US 2017/0126582 A1    May 4, 2017

Related U.S. Application Data

(63) Continuation of application No. 13/921,167, filed on Jun. 18, 2013, now Pat. No. 9,584,438.
(Continued)

(51) Int. Cl.
*G06F 15/173*    (2006.01)
*H04L 12/923*    (2013.01)
(Continued)

(52) U.S. Cl.
CPC ............ *H04L 47/762* (2013.01); *G06F 9/485* (2013.01); *H04L 43/04* (2013.01); *G06F 12/00* (2013.01)

(58) Field of Classification Search
CPC ....... H04L 47/762; H04L 43/04; G06F 9/485; G06F 12/00
(Continued)

(56) References Cited

U.S. PATENT DOCUMENTS 8,756,397 B2   6/2014 Chen et al.
2008/0313649 A1  12/2008 Tian
(Continued)

FOREIGN PATENT DOCUMENTS

WO    2005059750 A1    6/2005
WO    2012112331 A2    8/2012

OTHER PUBLICATIONS

"Appendix: People Soft Timeout Settings", Retrieved From «http://docs.oracle.com/cd/E28394_01/pt852pbh1/eng/psbooks/tsvt/chapter.htm?File=tsvt/htm/tsvt17.htm», Jun. 5, 2013, 7 Pages.
(Continued)

*Primary Examiner* — Wing F Chan
*Assistant Examiner* — Joseph R Maniwang
(74) *Attorney, Agent, or Firm* — Liang IP, PLLC (57) ABSTRACT

Systems and methods for handling idle websites on a Web server are disclosed. The duration between requests for a website application is monitored and compared to an idle time-out value. The idle time-out value may be a user-selected value that is the same for all website applications or an idle time-out value selected for a group of worker processes. When the idle time-out value is reached, all inactive memory allocations for the website application are paged-out. When a request for the website application is later received, memory for the website application is paged-in so that the request can be processed.

20 Claims, 3 Drawing Sheets

Related U.S. Application Data (60) Provisional application No. 61/830,129, filed on Jun. 2, 2013.

(51) Int. Cl.
*H04L 12/26* (2006.01)
*G06F 9/48* (2006.01)
*G06F 12/00* (2006.01)

(58) Field of Classification Search
USPC ........................................................ 709/227
See application file for complete search history.

(56) References Cited

U.S. PATENT DOCUMENTS

| | | | |
|---|---|---|---|
| 2012/0179744 A1 | 7/2012 | Sullivan et al. | |
| 2013/0047198 A1 | 2/2013 | Srour et al. | |
| 2013/0054735 A1 | 2/2013 | Chu et al. | |
| 2013/0160011 A1 | 6/2013 | Corrie | |
| 2013/0297668 A1 | 11/2013 | McGrath et al. | |
| 2013/0297673 A1* | 11/2013 | McGrath .............. | G06F 9/505 709/203 |

OTHER PUBLICATIONS

"Application Note 1005: Configuring OpenLM to Close Idle Licenses", Retrieved From «https://openlm.com/blog/application-note-1027_a-openlm-agent-installation-and-configuration/», Jun. 5, 2013, 7 Pages.

"Configure Idle Time-out Settings for an Application Pool (IIS 7)", Retrieved From «http://technet.microsoft.com/en-us/library/cc771956%28v=ws.10%29.aspx», Sep. 25, 2010, 3 Pages.

"Disk Drive with Embedded Hyper-Text Markup Language Server", in IBM Technical Disclosure Bulletin, vol. 38, Issue 12, Dec. 1, 1995, 3 Pages.

"Mac OS X 10.6 Server Admin: Configuring AFP Service Idle Users Settings", Retrieved From «https://support.apple.com/kb/PH8582?locale=en_GB», Jun. 5, 2013, 2 Pages.

"SAS(R) 9.2 Intelligence Platform: Web Application Administration Guide, Fourth Edition", Retrieved From «http://support.sas.com/documentation/cdl/en/biwaag/63149/HTML/default/viewer.htm#a003135318 htm», Nov. 27, 2010, 5 Pages.

"Set Process Working Set Size Function", Retrieved From «https://msdn.microsoft.com/en-us/library/windows/desktop/ms686234(v=vs.85)_aspx», Oct. 8, 2011, 3 Pages.

"Unix Signal", Retrieved From«http://en.wikipedia.org/w/index.php?title=Unix_signal&oldid=555340834», May 16, 2013, 6 Pages.

"Final Office Action issued in U.S. Appl. No. 13/921,167", dated Mar. 15, 2016, 11 Pages.

"Non Final Office Action Issued in U.S. Appl. No. 13/921,167", dated Aug. 12, 2015, 13 Pages.

"Notice of Allowance Issued in U.S. Appl. No. 13/921,167", dated Oct. 18, 2016, 8 Pages.

Buettcher, Stefan, "Virtual Memory", Retrieved From «https://www.student.cs.uwaterloo.ca/~cs350/F06/slides/cs350_E.pdf» Retrieved on: Apr. 8, 2015, 30 Pages.

"International Preliminary Report on Patentability Issued in PCT Patent Application No. PCT/US2014/039878", dated Sep. 4, 2015, 12 Pages.

"International Search Report and Written Opinion Issued in Patent Application No. PCT/US2014/039878", dated Oct. 6, 2014, 14 Pages.

Sinofsky, Steven, "Reclaiming Memory From Metro Style Apps", Retrieved From «http://blogs.msdn.com/b/b8/archive/2012/04/17/reclaiming-memory-from metro-style-apps.aspx», Apr. 17, 2012, 18 Pages.

Stanek, William R., "Microsoft IIS 6.0", Published by Microsoft Press, Jul. 2003, 58 Pages.

\* cited by examiner

IDLE WORKER-PROCESS PAGE-OUT

CROSS-REFERENCE TO RELATED APPLICATIONS

This application is a continuation application of U.S. patent application Ser. No. 13/921,167, filed on Jun. 18, 2013, which claims the benefit of the filing date of U.S. Provisional Patent Application No. 61/830,129, which is titled "Idle Worker-Process Page-Out" and was filed on Jun. 2, 2013, the disclosure of which is hereby incorporated by reference herein in its entirety.

BACKGROUND

Large numbers of websites are often hosted on a single server. This provides scalability so that required resources, such as memory and processing power, are increased as needed to meet performance demands based on the activity level on each individual website. Memory consumption can create a bottleneck on the website host server. In particular, websites with low activity, such as websites that are accessed only a few times per day or week, still consume memory even though they are idle.

Organizations that host a large number of websites discover that many of the websites are idle most of the time. For example, if an organization provides commercial web-hosting services, many of its customers are probably small businesses. Many small businesses need to have some web presence, but their websites are mostly designed to be a virtual billboard—they do not contain many or any applications, and they are typically visited only rarely. Some might be idle for hours, and some even days or weeks without a single visitor.

In such a situation, having the website active on the server wastes resources. Even a simple, static website typically uses up at least 6-10 MB of memory. A commercial web-hosting organization may run hundreds or thousands of such websites. These websites consume a large amount of memory for websites that rarely get visited. Most web server administrators configure their servers to automatically terminate such a website after a certain idle time.

However, terminating idle websites presents a user-experience problem because, the server must start the website when it receives a request to view the website. The start procedure for a website takes a certain amount of time during which the user has to wait, staring at a blank screen and/or rotating cursor. The startup can take over 10 seconds or more. Because of the start-up time required to reload the application, the delayed response to the request is likely to be noticeable to the user, who expects the website to be readily available on the server. Web users are accustomed to maximum response times on the order of a few seconds or less. Response times that exceed 10 seconds can result in the user losing focus and leaving the website. The startup time duration is frequently determined by the website application, which is not something that could be fixed by simply modifying the server code.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments allow resource conservation without reducing the user experience. The idle website may be suspended by a host Web server to allow active websites to use shared resources on the server. In one embodiment, code is provided that pages-out a website (e.g., a worker process) to disk. In this way, the websites may be resumed very quickly, which allows the visiting user to get a fast response to his request. The action of suspending/resuming is significantly faster than using a stop/start. Additionally, by suspending a website process, the server can free up resources because the suspended website will use minimal memory.

In one embodiment, a computing device including a processor and system memory, for example, perform websites hosting. The computing device monitors the duration between times when requests are received for a website application running on the computing device. The computing device determines when the duration has exceeded an idle time-out value. The idle time-out value may be a default value or a user-selected value that can be applied to individual website applications. When the idle time-out value is reached, the computing device frees up all inactive memory allocations for the website application. This may be achieved, for example, by page-out of the website application's memory allocations. When the computing device later receives a request for the website application, it pages-in memory for the website application so that the request can be processed.

In other embodiments, the computing device may provide a notification to the website application before paging out all inactive memory allocations. The website application then suspends operation of the website application in response to the notification to minimizing resource usage. The website application may provide a function to the computing device in response to the notification. When a new request is later received for the website application, the computing device calls the function in addition to paging-in memory for the website application.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
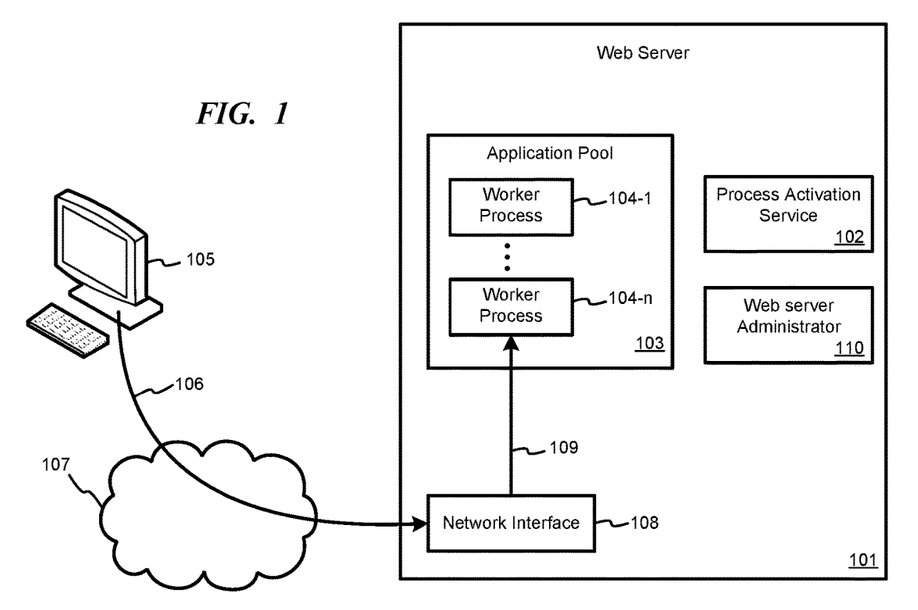
FIG. 1 illustrates a Web server according to an example embodiment.

FIG. 1 illustrates a Web server 101 according to an example embodiment. Web server 101 provides a secure, reliable, and scalable platform to manage, develop and host Web applications and services. Web server 101 may run Internet Information Services (IIS) from Microsoft Corporation, for example. A process activation service 102 manages configuration of an application pool 103 and creation of worker processes 104. Application pool 103 may support a grouping of URLs that are routed to one or more worker processes 104. Application pool 103 provides administration of the websites and applications running on worker processes 104. Requests sent to Web server 101 for a specific website are handled by a worker process 104-*n* corresponding to that website.

Users at terminal 105 send requests 106 to Web server 101 via a network 107, which may be the Internet or any public or private data network. Web server 101 may be a single machine or may be a component of a distributed computing network (i.e., a cloud-computing service). Requests 106 are received at a network interface 108 on Web server 101 and are routed 109 to the worker process 104-*n* corresponding to the URL in the request.

The service or application running on the worker process 104-*n* responds to the request as appropriate. For example, in response to an HTML Page request, Web server 101 returns the page in HTML format.

Idle applications on worker processes 104-*n* continue to run and consume memory while waiting for requests to be received. Some idle applications may also consume additional memory on their own without being triggered by user requests. For example, an application may allocate additional memory as a managed heap for garbage collection. This additional memory is consumed even when the application is idle.

In one embodiment, an "idle worker process page-out" feature is controlled by a Web server administrator 110. An idle time-out period may be defined (e.g., a default time may be 20 minutes since processing a last request) along with the action that the Web server should take when the time-out is detected. The idle worker process page-out may also be referred to as an "idle website page-out," "dynamic website page-out," or "idle page-out." The Web server administrator 110 may configure a default setup for all applications running on worker processes 104 and/or may configure settings per application pool 103. For example, the administrator 110 may select to have a process terminated or suspended upon reaching the idle time-out.

Figure 2:
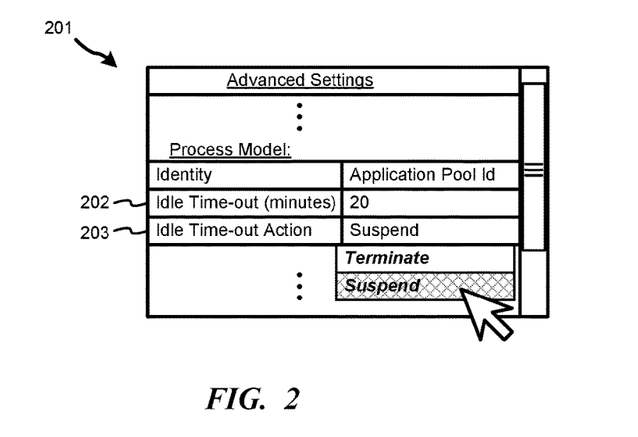
FIG. 2 illustrates an example advanced settings dialog to configure idle website page-out settings.

FIG. 2 illustrates an example advanced settings dialog 201 for the application pool, which may be used to configure the idle website page-out. A user may select options such as an Idle Time-out duration 202 and an Idle Time-out Action 203. For example, as illustrated in FIG. 2, the Idle Time-out duration is set to 20 minutes. In this case, when 20 minutes have elapsed after the last request was processed, the administrator will take the action specified. The Idle Time-out Action may be, for example, either to suspend or terminate the idle website.

In one embodiment, worker processes 104 that run on web server 101 use a pre-existing mechanism that monitors incoming HTTP requests. When a worker process has been idle (i.e., meaning not having received an HTTP request) for the period of time configured 202, the worker process will either terminate or suspend. If the application pool 102 for that worker process 104 has been configured for Suspend, then a "set process working set size" type function may be used to set the minimum and maximum working set sizes for the specified process. In one embodiment, by setting "minimum working set size" and "maximum working set size" parameters to −1 directs the worker process to page-out all inactive memory allocations. This results in the worker process releasing most of its memory. The result is referred to herein as a "suspended" process; however, the technical term for this result is "paged-out." As used herein, the term "suspend" should not be confused with the type of suspension the operating system and/or hardware computer goes through as part of power-management.

When an idle time-out is set, the process activation service (e.g., WAS) may simply terminate the worker-process of an idle website so that the CPU and memory resources are released. However, this also means that when a user does connect to the website, he or she has to wait for the website to start (i.e., a worker process must be spun up). This takes time—sometimes 10 seconds or more—during which the user is staring at a blank screen.

To improve the user experience, the idle worker-process page-out feature allows the Web server to put idle websites to sleep—i.e., page them out to disk. Instead of a process termination upon time-out, the process remains alive but suspended and consuming little resources. In addition to releasing memory, the suspended website may also release additional resources, such as database connections, CPU cycles, etc. When the website is requested, it is able to wake up from suspension almost instantly. In such a situation, the user receives the active website within seconds without having to wait for reloading of a terminated application.

After the process is suspended, when a new incoming HTTP request pertains to the suspended process, page faults at the operating system level will bring back the paged-out memory as needed. This "wakes up" the suspended process.

A worker process 104 has one or more applications tied to it. When a Suspend action for a process starts, a global notification (referred to herein as "GL_SUSPEND_PROCESS") is sent by the worker process. The GL_SUSPEND_PROCESS notification lets interested applications know that the process is about to be paged-out.

Since the worker process is just suspended but not fully terminated, cooperation may be required from the application running on the worker process. This would prevent the worker process from performing unnecessary operations that might page-in memory or consume other resources during the time period while the process is suspended.

The GL_SUSPEND_PROCESS notification is a mechanism by which an application may voluntarily suspend parts of its own operation in order to minimize or eliminate resource usage during the idle period. Optionally, the application may respond to the GL_SUSPEND_PROCESS notification and provide the worker process with a function to be used to notify the application when the process pages-in (i.e., "wakes up"). In this way, the application may be notified that it should prepare to start taking requests again.

Figure 3:
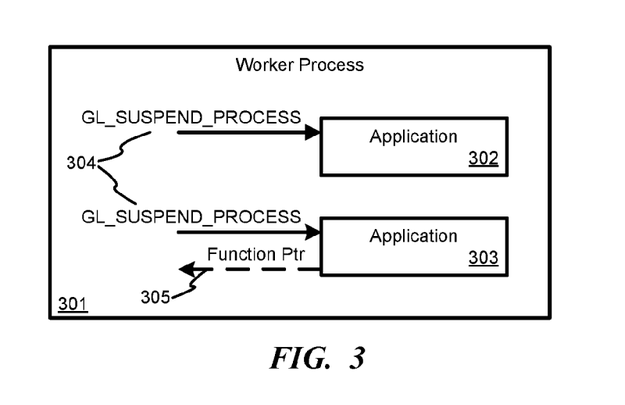
FIG. 3 illustrates the use of a global suspend process notification in one embodiment.

FIG. 3 illustrates the use of a global suspend process notification in one embodiment. Worker process 301 is running to two applications 302 and 303. When the website associated with both applications 302 and 303 has timed out (i.e., exceeded the idle time-out duration) and is going to be suspended, worker process 301 sends GL_SUSPEND_PROCESS as a global notification 304 to its applications. If application 303 wants to start a particular function when it is resumed, then application 303 may return a function pointer 305 to worker process 301. When a request is later received for suspended application 303, worker process 301 uses the function to notify application 303 that a new request has been received. Application 303 then pages-in and executes the function.

The process for handling suspension of the website application may be handled differently for different web application frameworks. When a website is suspended as described herein, it will still show up as an active task (e.g., in a Task Manager or a similar display) but will consume little memory or CPU.

Figure 4:
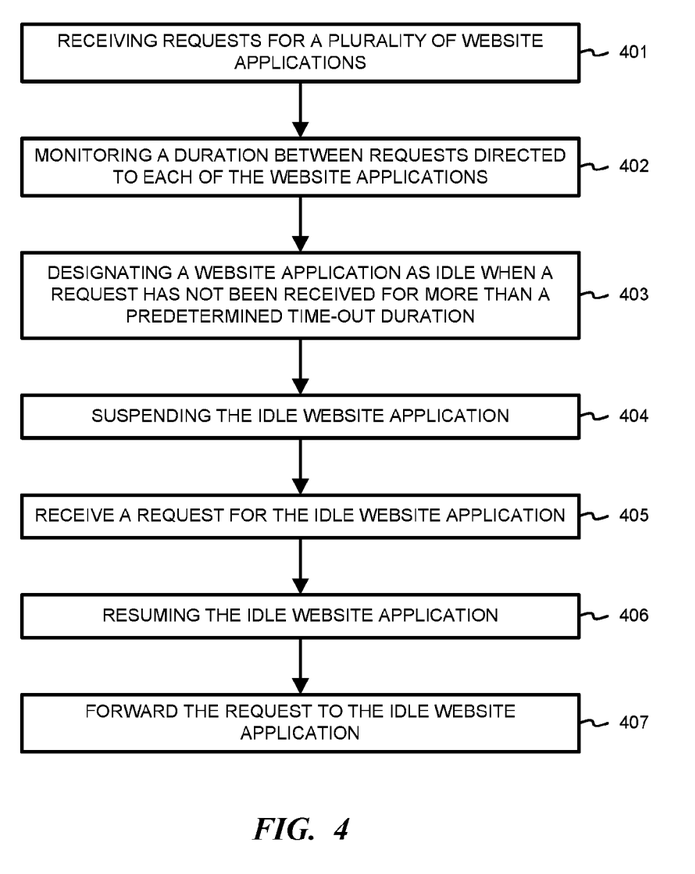
FIG. 4 is a flowchart illustrating a process for handling idle websites on a Web server according to one embodiment.

FIG. 4 is a flowchart illustrating a method or process for handling idle websites on a Web server according to one embodiment. In step 401, requests for a plurality of website applications are received at the Web server. In step 402, the durations between requests directed to each of the website applications is monitored by the Web server. In step 403, a website application is designated as idle when a request has not been received for that website application for more than a predetermined time-out duration. In step 404, the idle website application is suspended. The suspending may include, for example, paging-out a memory allocation for the idle website application. This frees up memory on the Web server for use by the active website applications.

In step 405, a new request is received for the idle website application. In step 406, the idle website application is resumed. The application may be resumed, for example, by paging-in memory for the idle website application. In step 407, the new request is forwarded to the idle website application for processing.

Figure 5:
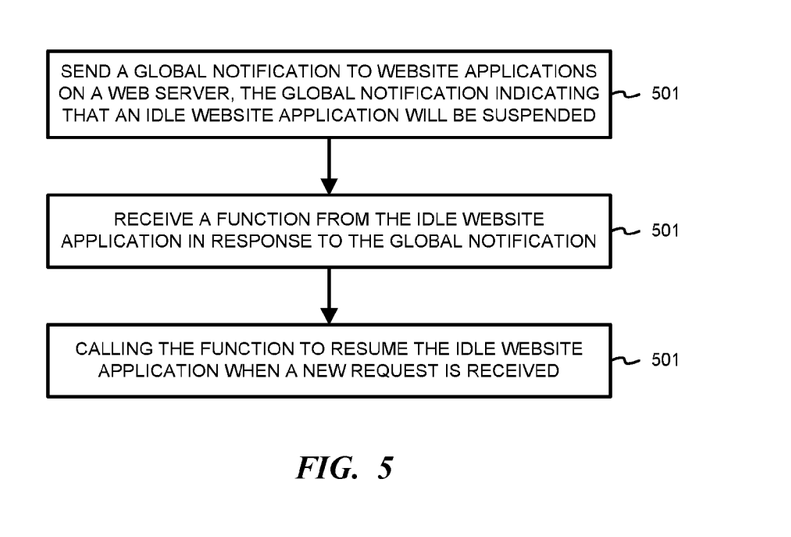
FIG. 5 is a flowchart illustrating a process for notifying website applications that they will be suspended because they have been idle.

FIG. 5 is a flowchart illustrating a process or method for notifying website applications that they will be suspended because they have been idle. In step 501, a global notification is sent to the website applications on a Web server. The global notification indicating that an idle website application will be suspended. The idle website application corresponds to a website that has not received any requests for longer than a time-out duration.

In step 502, a function is received from the idle website application in response to the global notification. In step 503, the function is called to resume the idle website application. The function notifies the website application that it needs to prepare to take requests again.

Figure 6:
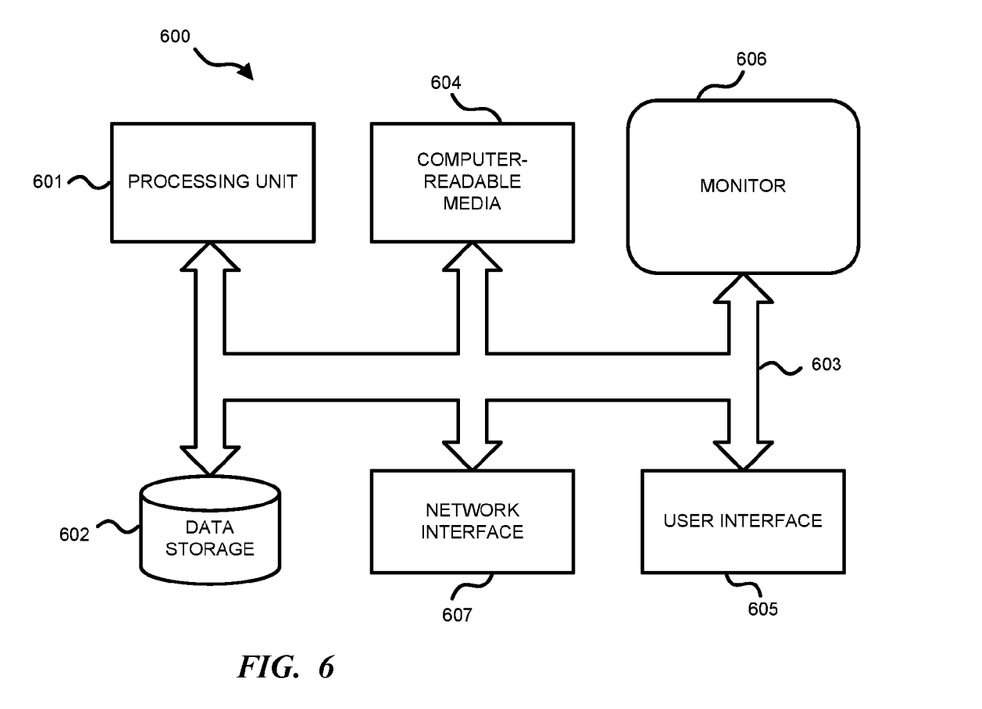
FIG. 6 illustrates an example computing and networking environment for hosting idle website applications.

FIG. 6 illustrates an example computing and networking environment 600 on which the examples of FIGS. 1-5 may be implemented to host and handle idle website applications. The computing system environment 600 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 600. Components may include, but are not limited to, various hardware components, such as processing unit 601, data storage 602, such as a system memory, and system bus 603 that couples various system components including the data storage 602 to the processing unit 601. The system bus 603 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 600 typically includes a variety of computer-readable media 604. Computer-readable media 604 may be any available media that can be accessed by the computer 600 and includes both volatile and nonvolatile media, and removable and non-removable media, but excludes propagated signals. By way of example, and not limitation, computer-readable media 604 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 602 includes computer storage media in the form of volatile and/or nonvolatile memory such as read only memory (ROM) and random access memory (RAM). A basic input/output system (BIOS), containing the basic routines that help to transfer information between elements within computer 600, such as during start-up, is typically stored in ROM. RAM typically contains data and/or program modules that are immediately accessible to and/or presently being operated on by processing unit 601. By way of example, and not limitation, data storage 602 holds an operating system, application programs, and other program modules and program data.

Data storage 602 may also include other removable/non-removable, volatile/nonvolatile computer storage media. By way of example only, data storage 602 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 600.

A user may enter commands and information through a user interface 605 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 601 through a user input interface 605 that is coupled to the system bus 603, but may be connected by other interface and bus structures, such as a parallel port, game port or a universal serial bus (USB). A monitor 606 or other type of display device is also connected to the system bus 603 via an interface, such as a video interface. The monitor 606 may also be integrated with a touch-screen panel or the like. Note that the monitor and/or touch screen panel can be physically coupled to a housing in which the computing device 600 is incorporated, such as in a tablet-type personal computer. In addition, computers such as the computing device 600 may also include other peripheral output devices such as speakers and printer, which may be connected through an output peripheral interface or the like.

The computer 600 may operate in a networked or cloud-computing environment using logical connections 607 to one or more remote devices, such as a remote computer. The remote computer may be a personal computer, a server, a router, a network PC, a peer device or other common network node, and typically includes many or all of the elements described above relative to the computer 600. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 600 may be connected to a public or private network through a network interface or adapter 607. In some embodiments, a modem or other means for establishing communications over the network. The modem, which may be internal or external, may be connected to the system bus 603 via the network interface 607 or other appropriate mechanism. A wireless networking component such as comprising an interface and antenna may be coupled through a suitable device such as an access point or peer computer to a network. In a networked environment, program modules depicted relative to the computer 600, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a web server hosting multiple websites, the method comprising:
   receiving requests, at the web server, to a website hosted on the web server, the website having a corresponding worker process configured to respond to the received requests;
   determining whether a duration between receiving the individual requests exceeds an idle time-out threshold; and
   in response to determining that the duration exceeds the idle time-out threshold,
      transmitting a notification to the website informing the website that the worker process is about to be suspended;
      receiving a function pointer from the website in response to the transmitted notification, the function pointer corresponding to a function invocation of which notifies the website that a new request to the website is received; and
      transferring content in memory allocations associated with the worker process in a system memory to a disk without suspending the website, the content transferred to the disk being retrievable from the disk in response to an invocation of a function associated with the received function pointer.

2. The method of claim 1 wherein transferring the content in memory allocations includes releasing the memory allocations to be used by other worker processes corresponding to other websites hosted on the web server.

3. The method of claim 1, further comprising suspending the website subsequent to transferring the content in the memory allocations to the disk and releasing database connections or CPU cycles previously consumed by the suspended website.

4. The method of claim 1 wherein:
   the website is a first website; and
   the worker process also supports a second website hosted on the web server in addition to supporting the first website.

5. The method of claim 1 wherein:
   the website is a first website;
   the worker process also supports a second website hosted on the web server in addition to supporting the first website; and
   transmitting the notification includes transmitting the notification to both the first website and the second website.

6. The method of claim 1 wherein:
   the website is a first website;
   the function pointer is a first function pointer;
   the function is a first function corresponding to the first function pointer;
   the worker process also supports a second website hosted on the web server in addition to supporting the first website; and determining whether the duration exceeds the idle time-out threshold includes determining whether the derived duration with respect to both the first and second websites exceeds the idle time-out threshold.

7. The method of claim 1 wherein:
the website is a first website;
the function pointer is a first function pointer;
the function is a first function corresponding to the first function pointer;
the worker process also supports a second website hosted on the web server in addition to supporting the first website; and
determining whether the duration exceeds the idle time-out threshold includes determining whether the duration with respect to both the first and second websites exceeds the idle time-out threshold; and
transferring the content includes transferring the content in memory allocations associated with the worker process in the system memory to the disk without suspending the first and second websites in response to determining that the duration exceeds an idle time-out threshold with respect to both the first and second websites.

8. A server hosting multiple websites, comprising:
a processor; and
a memory containing instructions executable by the processor to cause the processor to perform a process including:
monitoring for requests to a website hosted on the server, the website having a corresponding worker process configured to respond to requests to the website;
determining whether a request to the website has not been received for more than an idle time-out duration; and
in response to determining that a request to the website has not been received for more than the idle time-out duration,
notifying the website that the worker process is to be suspended;
receiving a function pointer from the website in response to being notified that the worker process is to be suspended;
transferring content in memory allocations corresponding to the worker process in a system memory to a disk without suspending the website; and
subsequent to transferring the content, suspending the worker process, wherein the worker process is resumable in response to a monitored new request by:
calling a function corresponding to the function pointer to inform the website that the worker process is to be resumed; and
resuming the worker process by transferring the content associated with the worker process from the disk to the system memory.

9. The server of claim 8 wherein transferring the content in memory allocations includes releasing the memory allocations to be used by other websites hosted on the server.

10. The server of claim 8 wherein the process performed by the processor further includes suspending the website subsequent to transferring the content in the memory allocations to the disk and releasing database connections or CPU cycles previously consumed by the suspended website.

11. The server of claim 8 wherein:
the website is a first website;
the worker process also supports a second website hosted on the server in addition to supporting the first website; and
notifying the website includes notifying both the first website and the second website that the worker process is to be suspended.

12. The server of claim 8 wherein:
the website is a first website;
the function pointer is a first function pointer;
the function is a first function corresponding to the first function pointer;
the worker process also supports a second website hosted on the server in addition to supporting the first website; and
calling the function includes:
calling the first function corresponding to the first function pointer to inform the first website that the worker process is about to be resumed; and
calling the second function corresponding to the second function pointer to inform the second website that the worker process is about to be resumed.

13. The server of claim 8 wherein:
the website is a first website;
the function pointer is a first function pointer;
the function is a first function corresponding to the first function pointer;
the worker process also supports a second website hosted on the server in addition to supporting the first website; and
calling the function includes in response to a monitored new request to the second website, calling the first function corresponding to the first function pointer to inform the first website that the worker process is about to be resumed.

14. The server of claim 8 wherein:
the website is a first website;
the function pointer is a first function pointer;
the function is a first function corresponding to the first function pointer;
the worker process also supports a second website hosted on the web server in addition to supporting the first website; and
determining whether a request to the website has not been received for more than the idle time-out duration includes determining whether a request to either the first website or the second website has not been received for more than the idle time-out duration.

15. A method performed by a web server hosting multiple websites, the method comprising:
receiving a request, at the web server, to a website hosted on the web server, the website having a corresponding worker process that is configured to respond to the received requests to the website and is currently suspended; and
in response to receiving the request,
calling a function corresponding to a function pointer to inform the website that the worker process is to be resumed, the function pointer being previously provided by the website prior to transferring content in memory allocations associated with the worker process in a system memory of the web server to a disk and subsequently suspending the worker process;
retrieving the content associated with the worker process from the disk to the system memory of the web server; and resuming the worker process with the retrieved content to produce a response to the received request to the website.

16. The method of claim 15 wherein the website is not suspended when the worker process is suspended.

17. The method of claim 15 wherein the website is not suspended when the worker process is suspended, and wherein the function pointer is previously provided by the website in response to a notification that the worker process is to be suspended.

18. The method of claim 15 wherein:
the website is a first website;
the function pointer is a first function pointer;
the function is a first function corresponding to the first function pointer;
the worker process also supports a second website hosted on the web server in addition to supporting the first website; and
calling the function includes:
  calling the first function corresponding to the first function pointer to inform the first website that the worker process is about to be resumed; and
  calling the second function corresponding to the second function pointer to inform the second website that the worker process is about to be resumed.

19. The method of claim 15 wherein:
the website is a first website;
the function pointer is a first function pointer;
the function is a first function corresponding to the first function pointer;
the worker process also supports a second website hosted on the web server in addition to supporting the first website;
receiving the request to the website includes receiving the request to the second website; and
calling the function includes calling the first function corresponding to the first function pointer to inform the first website that the worker process is about to be resumed in response to the received request to the second website.

20. The method of claim 15 wherein the worker process is suspended due to idle time-out.

* * * * *